(12) United States Patent
Muller et al.

(10) Patent No.: US 8,236,120 B2
(45) Date of Patent: Aug. 7, 2012

(54) METHOD AND APPARATUS FOR MANUFACTURING A WRAP-AROUND TUBE

(75) Inventors: Christian Muller, Olpe (DE); Friedhelm Schafer, Burbach (DE)

(73) Assignee: Novelis Deutschland GmbH, Gottingen (DE)

( * ) Notice: Subject to any disclaimer, the term of this patent is extended or adjusted under 35 U.S.C. 154(b) by 978 days.

(21) Appl. No.: 12/091,871

(22) PCT Filed: Oct. 10, 2006

(86) PCT No.: PCT/EP2006/009769
§ 371 (c)(1),
(2), (4) Date: Sep. 2, 2008

(87) PCT Pub. No.: WO2007/048498
PCT Pub. Date: May 3, 2007

(65) Prior Publication Data
US 2009/0301646 A1     Dec. 10, 2009

(30) Foreign Application Priority Data

Oct. 28, 2005   (DE) .......................... 10 2005 051 788

(51) Int. Cl.
*B32B 37/00* (2006.01)
(52) U.S. Cl. ........ 156/191; 156/194; 156/195; 156/425; 156/443
(58) Field of Classification Search .................. 156/195, 156/191, 194, 425, 443
See application file for complete search history.

(56) References Cited

U.S. PATENT DOCUMENTS

| | | | | | |
|---|---|---|---|---|---|
| 3,515,038 | A | * | 6/1970 | Perusse et al. | 493/299 |
| 3,528,159 | A | * | 9/1970 | Miles | 29/423 |
| 3,685,329 | A | * | 8/1972 | Amos et al. | 72/129 |
| 4,113,546 | A | * | 9/1978 | Anders | 156/195 |
| 5,672,232 | A | | 9/1997 | Clack | |

FOREIGN PATENT DOCUMENTS

| | | |
|---|---|---|
| CN | 2207242 Y | 9/1995 |
| DE | 10 01 582 B | 1/1957 |
| DE | 18 53 216 U | 6/1962 |
| DE | 31 16 990 A1 | 5/1980 |
| DE | EP 1 371 405 A1 | 12/2003 |
| GB | 2075880 A * | 11/1981 |
| JP | 5811132 A | 1/1976 |
| JP | 5140580 A | 4/1976 |
| JP | 5194460 A | 6/1983 |
| JP | 9174152 A | 7/1997 |
| WO | WO 98/02297 A | 1/1998 |

* cited by examiner

*Primary Examiner* — Jeff Aftergut
(74) *Attorney, Agent, or Firm* — Robert L. Stearns; Dickinson Wright, PLLC

(57) ABSTRACT

In a method for manufacturing a wrap-around tube from at lest one strip-shaped material, the wrapping is brought about by at least one rotating wrapping element which is indirectly or directly in engagement with the wrap-around tube, and the strip-shaped material is wrapped onto a stationary wrapping core. An apparatus for manufacturing a wrap-around tube from at least one strip-shaped material is distinguished by the fact that it has a rotating wrapping element, which is indirectly or directly in engagement with the wrap-around tube, and a stationary wrapping core, onto which the at least one strip-shaped material is wrapped.

17 Claims, 1 Drawing Sheet

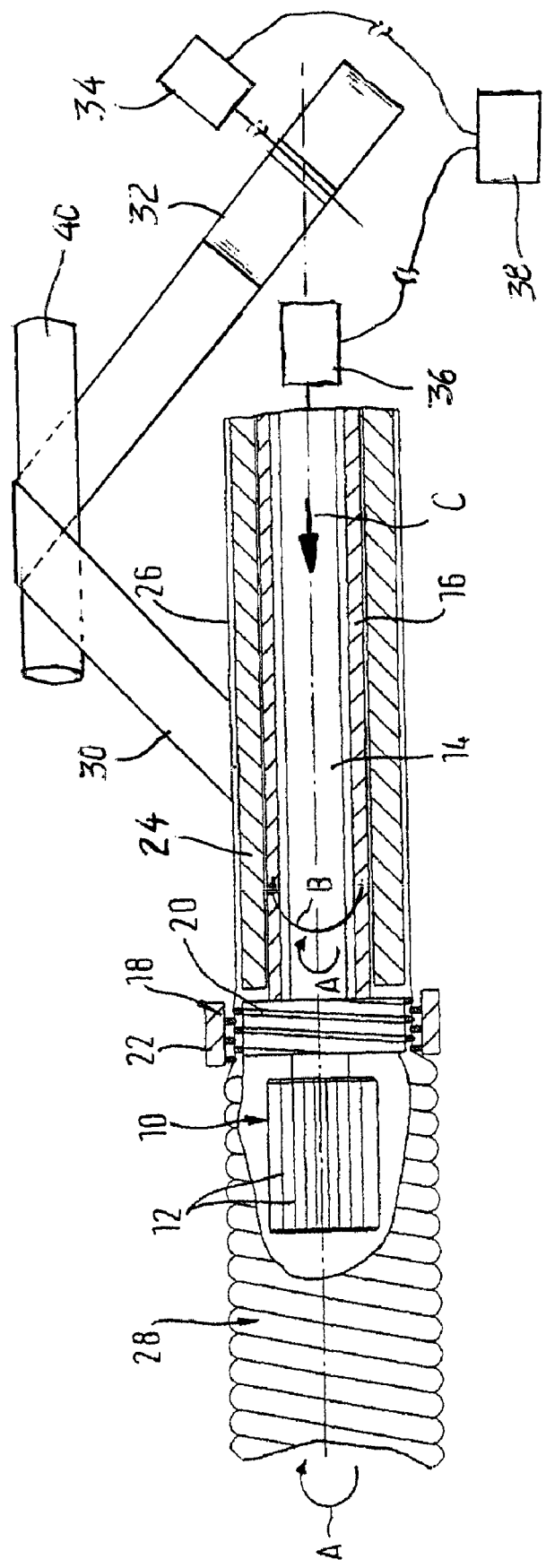

METHOD AND APPARATUS FOR MANUFACTURING A WRAP-AROUND TUBE

BACKGROUND OF THE INVENTION

1. Field of the Invention

The invention relates to a method and a device for the manufacture of a wrapped tube.

2. Related Art

Wrapped tubes are known in principle and consist of one or more plies of a strip material wound in a helix. Typically, wrapped tubes of this nature are provided with a crease so that they are pliable and flexible and thereby are suited for numerous applications. Wrapped tubes of this nature are used, for instance, in automotive engineering as a sleeve providing protection to wires or cables against radiant heat. A further application may be use as heat-delivery tubes, in caravan and mobile home construction, for example.

A device for the manufacture of helically wound, creased tubes is known from DE 1 001 582 B in which a tube acting as a winding element draws strip material from reels which rotate around fixed axes. The strip materials are wound around the rotating winding element. Similar disposals are known from DE 31 16 990 A1 and DE 1 853 216 U.

SUMMARY OF THE INVENTION

The object of the invention is to create a method and a device for the manufacture of a wound tube which are improved in respect of their efficiency.

The winding process in a method for the manufacture of a wrapped tube from at least one strip material is effected by at least one rotating winding element that is directly or indirectly in engagement with the wrapped tube. With regard to the strip material, it should be stated that this may be formed from metal, for instance aluminium, paper, plastic film or any other suitable material. The wrapped tube is preferably wound with multiple plies, for example three plies. It is, however, also possible to provide more than three plies, for instance, five material plies. Notwithstanding the number of the material plies, it is preferred that at least one ply of material consists of metal, preferably aluminium.

The strip material is wound with an overlap to ensure stability. In addition, the wrapped tube is usually wound from a plurality of plies in the method according to the invention. A currently preferred structure comprises an inner ply of aluminium and two outer plies of paper. Each ply is wound independently with an overlap. In addition, at least one of the plies incorporates a heat-activatable adhesive. This adhesive is activated once the wrapped tube has been wound, as described in greater detail below, and preferably been creased, to bond the individual plies firmly with one another. The two paper outer plies, for example, may comprise an adhesive coating of this nature on their inner face. The strip may be 45 mm to 60 mm in width, for instance, and the overlap may be 5 mm, for example. The overlap may, however, amount to up to 50% of the strip width.

As part of the manufacture of the wrapped tube, the strip material is initially wound into a sleeve. This winding is created according to the invention by a rotating winding element. This represents the decisive difference over the prior art. Conventionally, winding was performed by the movement of one or a plurality of reels on which the strip materials are wound, around a winding core. The winding core and the wound sleeve conventionally were stationary in the circumferential direction while the reels rotated around the sleeve to be wound. According to the new method, the reels may stand still and the sleeve to be wound is driven in rotation by the rotating winding element. The winding element may be, for example, what is known as a core mandrel, which is located inside the wrapped tube and is fitted on its outside with axially running projections, for instance teeth, which are directly or indirectly in engagement with the inner side of the wrapped tube. Alternatively, for example, a plurality of rotating wheels may be in engagement with the inner side of the tube. A further option may be that one or a plurality of winding elements, for instance wheels, rollers or rotating conveyor belts may be in engagement with the outside of the tube. In each case, a rotating movement will hereby be imparted to the wrapped tube or an initially generated, sleeve described in more detail below and, innovatively, the strip materials can, for instance, be drawn from stationary reels. It is, however, also conceivable, that the device used as part of the method according to the invention is located downstream of a device for the manufacture of a strip material intended to be wound into a wrapped tube. In this case, the strip will be further processed into the wrapped tube practically immediately after its manufacture. It should be mentioned, however, that the use of material wound onto reels is currently preferred, said material being, as mentioned, at least partially unwound from the reels by the rotating movement of the rotating winding element.

The method according to the invention results in the advantage that the reels can be stationary. Since the reels no longer need to rotate around the tube to be wrapped, they can be substantially larger than was previously the case. The strength limit has been reached on the conventional devices, in which a plurality of reels has to be rotated around the tube to be wrapped. This meant that both the maximum size, i.e. the weight of the reels, and also the maximum winding speed was restricted. The method according to the invention allows the reels to be significantly larger. While previously diameters of around 400 mm were usual, for instance, tests have shown that the reels can have a diameter of up to 1000 mm. This means around six times the length of strip material. Thus the set-up times can be significantly reduced, as the reels have to be changed substantially less frequently. Furthermore, the reels now used can also be designed differently from the conventional reels in that the width of the strip material can be increased. This means that new types of wrapped tubes can be manufactured.

Furthermore, the winding element used according to the invention has a clearly lower moment of inertia than the device previously used to rotate a plurality of reels around the tube to be wrapped. This allows higher speeds of rotation to be achieved, so that the efficiency is further enhanced. The speeds achieved in tests, for example, were a number of times higher than those achieved in the conventional method. It has furthermore become clear that the wrapped tubes manufactured by the new method have better flexibility, which is advantageous for certain applications. Finally, the method according to the invention offers improved safety, particularly on a change of material, as this no longer has to be performed on rotating reels which have numerous crushing points.

The strip materials are wound on to what is known as a winding core that is stationary and so no drive is required for this.

As mentioned, at present what is known as a core mandrel, located inside the wrapped tube, is preferred for the winding element that is directly or indirectly in engagement with the wrapped tube. Experiences with an embodiment of this nature in tests of the method according to the invention were particularly good. An indirect engagement between the core mandrel and the wrapped tube can be given if a process paper is used between the core mandrel and the inner side of the wrapped tube which is removed from the finished wrapped tube and can be used in the manufacturing process to reduce friction by being lubricated on at least one side. Engagement with the wrapped tube can be provided in a particularly reliable fashion if the core mandrel is fitted with an external engagement means, or in other words with axially running projections.

Additionally, it is currently preferred that the at least one strip material is unwound from at least one reel. In this way, the method according to the invention can favourably operate independently of the manufacturing method for the manufacture of the strip materials. More particularly, the strip materials can be made available wound onto reels and processed into the wrapped tube at the appropriate time. It is particularly advantageous if at least one reel is stationary. In principle, it is conceivable that these reels also rotate around the tube to be wrapped. The winding speed can be increased thanks to the additional rotation of the winding element in this case. If, furthermore, the speed of rotation of the reels is reduced by comparison with methods previously known, the reels can be made larger and hence heavier, which, as mentioned above, makes it possible to increase the amount of material on each reel, so that efficiency as a whole is increased. Despite these options, it is presently preferred to mount at least one and preferably all the reels in a stationary position, which offers advantages for the operational reliability and options for the design of the reels.

In principle, the strip materials can be unwound from the various reels by the action of the rotating winding element alone. On the basis of the test results, however, it is preferred that at least one reel, and preferably all the reels, are driven. In this way an uninterrupted supply of the material can be advantageously guaranteed.

In this context, it has also been shown to be advantageous if the drive of at least one reel is coupled with the drive of the winding element, with the drive of the winding element providing, to some extent, the setpoint for the speed of rotation of the reel drive. Herein, the rotating winding element is, so to speak, the master, and specifies the speed for the one or the plurality of reel drives.

It is favourable for the layout of the device used in conjunction with the method according to the invention if the strip material is deflected simply at least once. This makes it possible, for example, for one or more reels to be mounted not necessarily next to the winding device but essentially aligned with it. In this way, the device as a whole can favourably be designed to be narrow. It is not necessary, in particular, to provide a comparatively large width for the device used, as would be required for a side-by-side disposal of the reels, but this is not necessary in the further course of the device, in particular when winding the tube.

It has been shown in the tests that the winding core permits a particularly reliable operation if it is polished to a high gloss. This is because the tube to be wrapped, which can be thought of as a sleeve in the area of the winding core, must rotate in the circumferential direction with regard to the winding core, so that in the case of a highly polished winding core, favourably low coefficients of friction may be achieved.

Preferably, as part of the method according to the invention, the wrapped tube is further conveyed axially or advanced by a helical folding tool. This can consist, for example, of a worm screw element in the tube and an externally located nut acting in conjunction with it. In the currently preferred method, the folding tool rotates in the same direction as the winding element and conveys the wrapped tube in the axial direction by reason of its helical form and a difference in the speed of rotation with reference to the speed of rotation of the winding element. Additionally, the folding tool can make a coarse crease in the wrapped tube and press the individual plies of the material together. Finally, the folding tool according to the currently preferred embodiment pushes the wrapped tube onto the core mandrel inside the tube and the wrapped tube is compressed by the friction between the core mandrel and the wrapped tube, and the crease becomes clearly more defined. The adhesive may be activated by the action of heat immediately after the core mandrel. The drive for the folding tool may be located inside the winding core. Furthermore, the drive for the core mandrel can be passed through the folding tool drive. In this case, the drive for the core mandrel takes the form of a solid shaft and the drive for the folding tool takes the form of a hollow shaft.

The object referred to above is further solved by the device which essentially comprises the features corresponding to those of the method according to the invention. In particular, a rotating winding element is provided that is directly or indirectly in engagement with the wrapped tube and performs the winding. The preferred embodiments of the device according to the invention essentially correspond to those of the method described above. It should be mentioned in addition that the at least one reel is preferably mounted stationary and/or is mounted such that it is largely aligned with the winding device. The at least one strip material may be deflected by a highly polished, stationary rod with a diameter of 100 mm to 150 mm, for instance. The drive for the reels may be coupled with the drive of the rotating winding element, which provides a specification for the speed of rotation of the reel drive. Furthermore, a strip control may be provided on the reel to guarantee a reliable supply of the material.

BRIEF DESCRIPTION OF THE DRAWING

The invention will be explained in more detail below on the basis of an exemplary embodiment illustrated in the drawing.

The drawing shows in a partial cutaway representation the essential parts of the device according to the invention.

DETAILED DESCRIPTION OF AN
EMBODIMENT OF THE INVENTION

As can be seen in the drawing, the device according to the invention comprises on the one hand a core mandrel 10 which may be 100 mm long, for instance, and can be provided with projections or teeth 12 running in the axial direction. The core mandrel 10 is driven in a direction A. This is done by a shaft 14 on the embodiment shown. This shaft 14 is located in a hollow shaft 16, which drives a folding tool 18 in a direction B that is synchronised with direction A. In the case shown, this direction of rotation is clockwise when the disposal is viewed from direction C. In the embodiment shown, the inner element of the folding tool 18, the worm screw 20, is driven. This is enclosed by a nut 22. Between the two is the wrapped tube, as will be described in more detail below.

The hollow shaft 16 provided as a drive for the folding tool 18 is further located inside the winding core 24. A sleeve 26 is wound onto this winding core 24 with the core mandrel 10 being in engagement with the inner side of the tube to be wrapped 28 and driving said tube in direction A so that strip materials 30 are, for instance, unwound from one or more reels 32 that may be stationary or idle (i.e., nondriven and nonrotating) about the axis of the mandrel 10. Alternatively or as a complement to this, it is possible, as described above, that the reels 32 are driven as by drive 34. The drive 34 may be coupled to a drive 36 for the mandrel 10 through controller 38 so that the speed of the reels 32 can be set or synchronized by the speed of the mandrel 10. The strip material 30 can be deflected at least once by deflector 40 so that the reels 32 can be aligned in line with the mandrel 10, as illustrated rather than next to it, as previously described. It should be noted in respect of the size ratios between the core mandrel 10 and the wrapped tube 28 in the drawing that the core mandrel is represented with a smaller diameter than is actually the case in order to make the drawing clearer. The core mandrel is directly or indirectly (for instance by way of the process paper described above) in engagement with its radial outer side, i.e. in the embodiment shown with the teeth 12 by way of the wrapped tube 28, in particular the "corrugation valleys" of the crease.

The structure of the sleeve 26 and of the later wrapped tube 28, comprising a plurality of plies applied with an overlap, is not shown in detail in the FIGURE for the sake of simplicity. The strip materials are, however, as can be seen in the drawing, wound onto the winding core 24 in the form of the sleeve 26 with a largely smooth outer face and inner face. The sleeve 26 is moved in the axial direction C and furthermore given a coarse crease by the relative rotation of the folding tool 18 in respect of the sleeve 26 and by the helical form of the folding tool 18. The movement in the axial direction causes the folding tool 18 to push the coarsely creased sleeve 26 onto the core mandrel 10. There, because of the friction between the core mandrel 10 and the sleeve 26, the sleeve is compressed and a finer crease is created.

It is possible subsequently to activate the adhesive coating provided on the individual plies by the action of heat. This is not illustrated in the drawing. Further, the tube created can be extended on the desired crease and cut off to the desired length.

The invention claimed is:

1. Method for the manufacture of a wrapped tube from at least one strip material, wherein the wrapping is effected by at least one rotating winding element that is directly or indirectly in engagement with the wrapped tube and the strip material is wound onto a stationary winding core, wherein a core mandrel inside the wrapped tube is used as the winding element, and forming a crease in the wrapped tube with a folding tool that is a separate element from the core mandrel, and wherein the core mandrel inside of the tube is in engagement with only the valleys of the crease formed by the folding tool.

2. Method according to claim 1, wherein the at least one strip material is unwound form at least one reel.

3. Method according to claim 2, wherein the at least one reel is stationary.

4. Method according to claim 2 wherein the at least one reel is driven.

5. Method according to claim 4, wherein the drive for at least one driven reel is coupled with a drive of the winding element and the drive of the winding element supplies the specification for the speed of rotation of at least one driven reel.

6. Method according to claim 1, wherein the strip material is deflected at least once before being wrapped.

7. Method according to claim 1, wherein the wrapped tube is conveyed axially by a helical folding tool and a coarse crease is applied to the wrapped tube by the helical folding tool.

8. Device for the manufacture of a wrapped tube from at least one strip material, comprising: a rotating winding element that is directly or indirectly in engagement with the wrapped tube and effects the winding and a stationary winding core onto which the at least one strip material is wound and a folding tool that is a separate element from the winding element for forming a crease in the wrapped tube, wherein the winding element is a core mandrel inside the wrapped tube for engagement with only the valleys of the crease formed by the folding tool.

9. Device according to claim 8, wherein the core mandrel is provided with an external engagement surface.

10. Device according to claim 8, including at least one reel from which the strip material is unwound.

11. Device according to claim 10, at least one reel is non-driven.

12. Device according to claim 10, wherein the at least one reel is driven.

13. Device according to claim 12, wherein the drive of at least one driven reel is coupled with a drive for the winding element and the drive of the winding element supplies the specification for the speed of rotation of the drive of at least one driven reel.

14. Device according to claim 10 at least one reel is generally aligned with the winding device.

15. Device according to claim 8, wherein at least one deflector device is provided for the strip material.

16. Device according to claim 8, wherein the winding core is highly polished.

17. Device according to claim 8, wherein said device includes a helical folding tool which conveys the wrapped tube axially and applies a coarse crease to said tube.

* * * * *